UNITED STATES PATENT OFFICE.

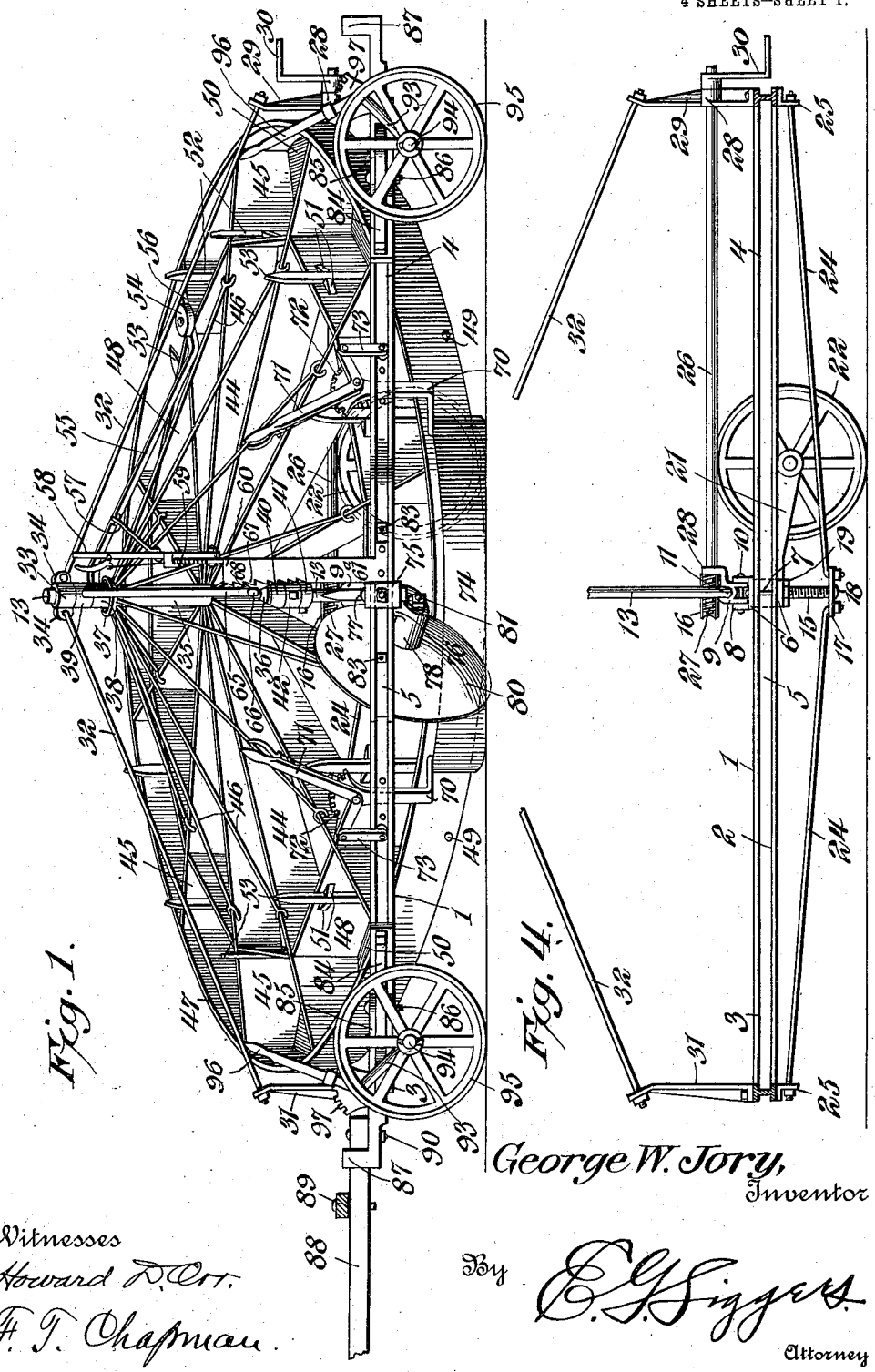

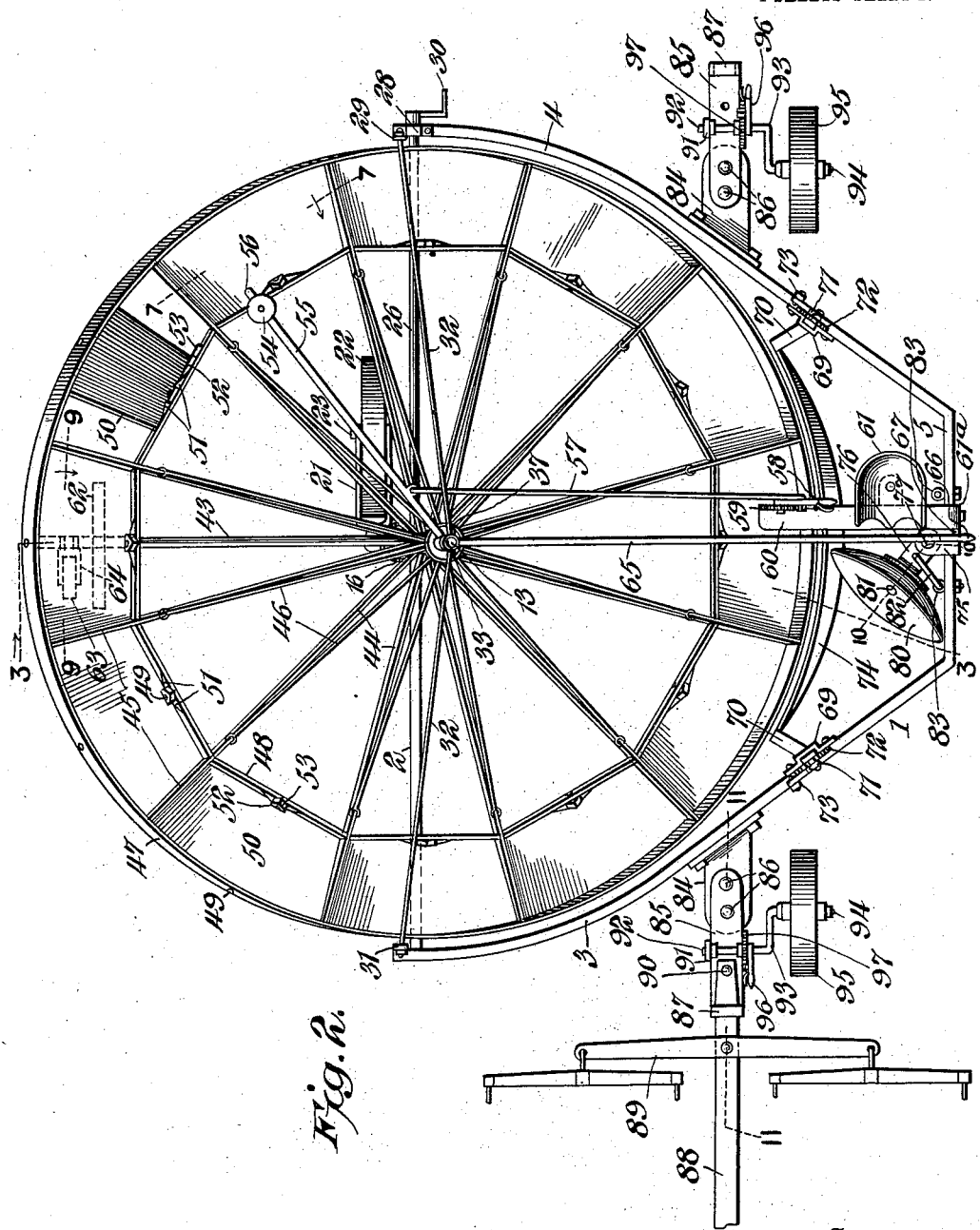

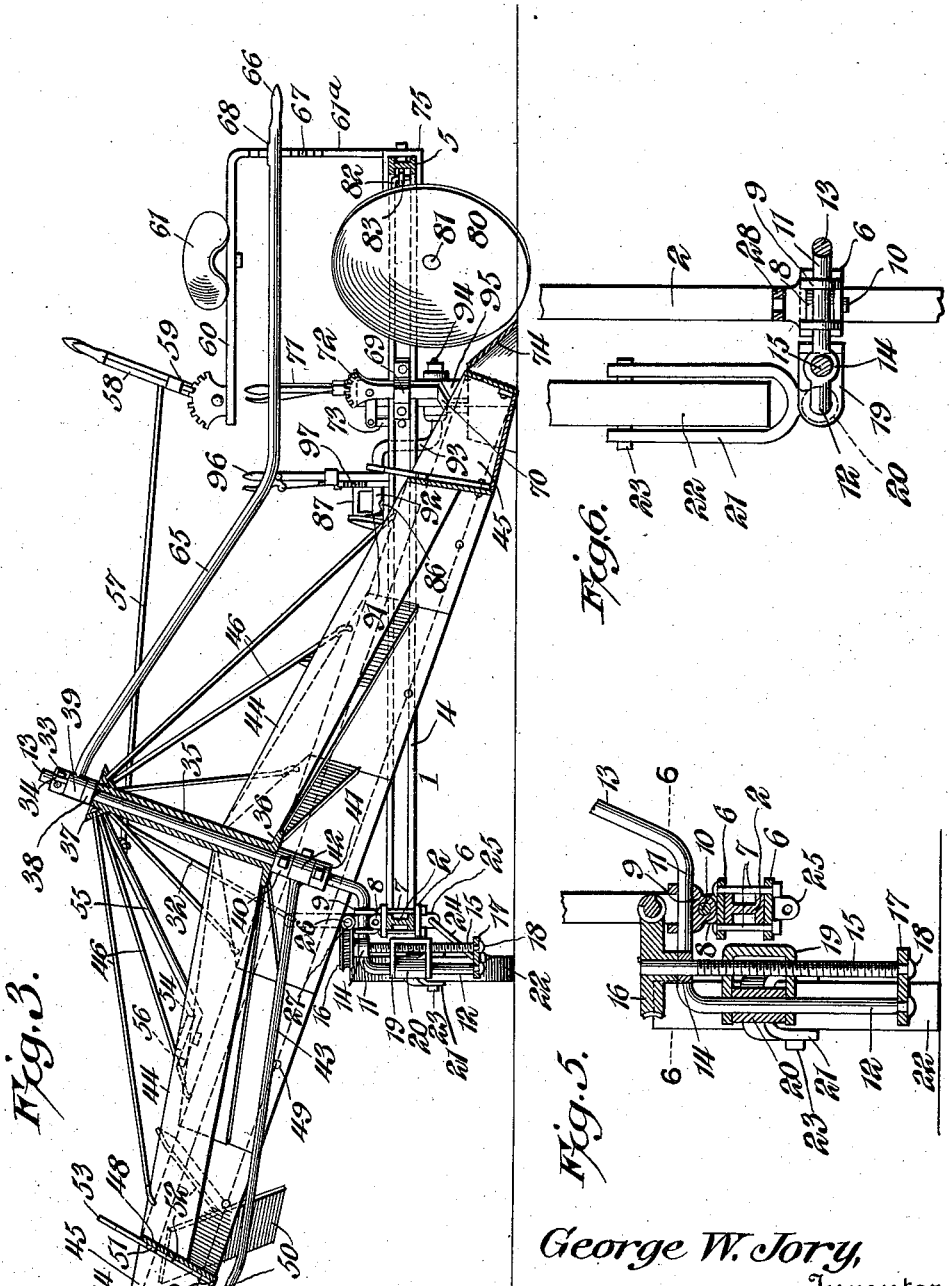

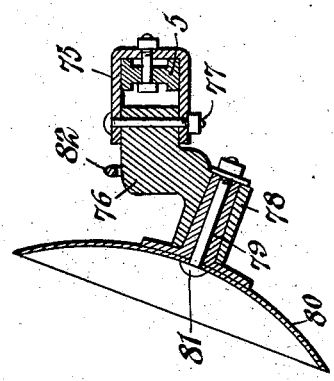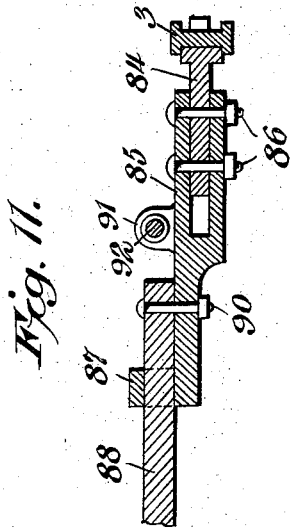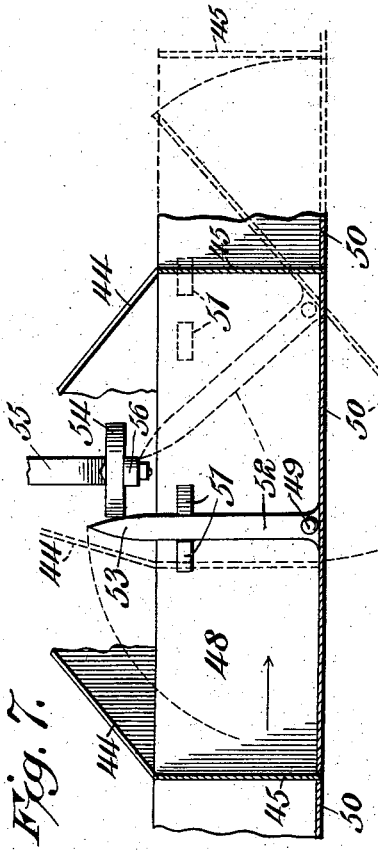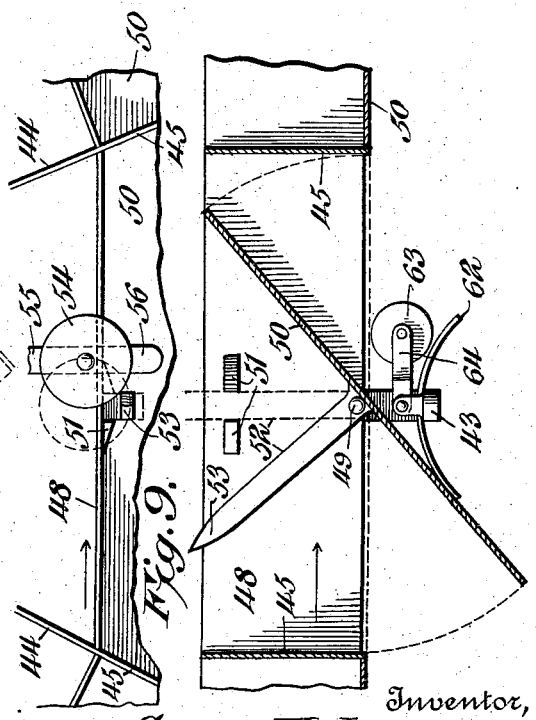

GEORGE WASHINGTON JORY, OF MARYSVILLE, CALIFORNIA.

DITCHER AND GRADER.

1,028,734.  Specification of Letters Patent.  Patented June 4, 1912.

Application filed May 27, 1911. Serial No. 629,822.

*To all whom it may concern:*

Be it known that I, GEORGE W. JORY, a citizen of the United States, residing at Marysville, in the county of Yuba and State of California, have invented a new and useful Ditcher and Grader, of which the following is a specification.

This invention has reference to improvements in machines for ditching and grading and its object is to provide a light draft machine which by its progressive movement along the surface of the ground may be caused to either produce a ditch in the ground, or remove a small depth of earth for grading purposes, the removed earth in either case being deposited in a circular series of buckets carried by a circular spider mounted on the machine to rotate on an axis set at an angle whereby one edge of the bucket or spider is brought into contact with the ground, while the opposite edge is elevated, and means are provided for opening and closing the buckets when the desired elevation is reached.

In accordance with the present invention provision is made for regulating the pressure of the edge of the bucket brought into engagement with the ground, whereby the rotative impulse may always be maintained irrespective of the character or condition of the ground. Furthermore, provision is made for elevating and lowering the body of the machine as a whole and, also, for reversing the direction of travel of the machine, the last feature being particularly useful where the deposited dirt must always be on a certain side of the line of travel irrespective of the direction of travel.

The invention will be best understood from a consideration of the following detailed description, taken in connection with the accompanying drawings forming a part of this specification, with the understanding, however, that while the drawings illustrate a practical form of the invention, it may be otherwise embodied in practical form, and, therefore, the invention is not limited to the exact structure illustrated.

In the drawings:—Figure 1 is a side elevation of the machine as viewed from the plow side. Fig. 2 is a plan view of the machine. Fig. 3 is a section on the line 3—3 of Fig. 2. Fig. 4 is a front to rear section through the frame of the machine, other parts being omitted. Fig. 5 is a vertical section through the elevating means for the supporting wheel at the dumping side of the machine, looking toward said wheel. Fig. 6 is a section on the line 6—6 of Fig. 5. Fig. 7 is a section on the line 7—7 of Fig. 2 drawn to a larger scale, and illustrating certain operative positions of the parts in dotted lines. Fig. 8 is a plan view of the structure shown in Fig. 7. Fig. 9 is a section on the line 9—9 of Fig. 2 but with the bottom of the bucket shown as in the open position. Fig. 10 is a section on the line 10—10 of Fig. 2. Fig. 11 is a section on the line 11—11 of Fig. 2.

Referring to the drawings, there is shown an end frame 1 of approximately triangular shape with the apex of the triangle cut off, and this frame may be formed of structural steel, preferably of I-beams. In the particular form of the frame illustrated there is a reach member 2, side members 3, 4, and a connecting member 5 at the approaching ends of the side members, the said side members 3, 4 being bent to accommodate certain portions of the structure to be hereinafter described.

At an intermediate portion of the reach member 2 there is a clip structure comprising two plates 6, 6 connected together by bolts 7 on opposite sides of the reach 2 in a manner to clamp the plates 6 firmly to the reach. One of the plates 6 is provided with a pair of ears 8 and between these ears there is pivoted a block 9 by means of a pivot pin or bolt 10, so that this block may rock on an axis longitudinally of the reach 2. The block 9 is formed with bearings for a bar 11 which, when the machine is in operation, is substantially parallel with the ground upon which the machine rests. At one end the bar 11 is bent at substantially right angles forming an extension 12 and at the other end is bent at an angle forming an angle spindle 13, the angle of the spindle 13 with relation to the bar 11 being greater than a right angle.

Between the block 9 and the right angle extension 12 the bar 11 is extended, as shown at 14, to constitute a bearing for a shaft 15 carrying above the bearing 14 a worm gear wheel 16. The shaft 14 is at the end remote from the worm gear 16 reduced and passed through a plate 17, and at the other side of the plate 17, may be headed, as shown at 18, so that while the shaft 15 is free to rotate in its bearings 14 and 17, the headed end 18 will prevent longitudinal movement of this shaft in its bearings. Between the bearings 14 and 17 the shaft 15 is screw-threaded for a purpose which will presently appear.

Mounted on the threaded portion of the shaft 15 is a yoke 19 appropriately threaded where traversed by the shaft, this point being near the connecting member of the yoke 19 and between the free ends of the legs of the yoke there is lodged a block 20 traversed by the angle extension 12 of the bar 11. To this block 20 there is secured the connected end of a yoke 21, the legs of which are sufficiently elongated to receive between them a caster wheel 22 having a spindle 23 carried by the free ends of the legs of the yoke 21.

The plate 17 has connected to opposite sides of it brace rods 24 extending to eye brackets 25 made fast to the end portions of the reach 2, these brace rods resisting any tendency of the clips 7 moving in the direction of the length of the reach 2.

When the shaft 15 is rotated, the yoke 19 is raised or lowered with reference to the position of the machine in operation, and the relation of the caster wheel 22 with reference to the reach 2 is varied accordingly, and any rotative movement of the shaft 15 will result in raising or lowering the reach 2 with relation to the ground, so that the portion of the frame 1 constituted by the reach 2 may be raised or lowered as desired. For this purpose there is provided a shaft 26 carrying a worm 27 in mesh with the worm wheel 16 and provided with an appropriate bearing 28 at one end, which bearing may be carried by the block 9. At the other end the shaft 26 passes through a bearing 28 formed in a bracket 29, and beyond this bracket said shaft is provided with a crank member 30 within ready reach of an operator, whereby the reach portion of the frame may be readily raised or lowered at will. The bracket 29 is made fast to the reach 2 at one end of the latter, and in the particular showing of the drawings at the end to which is joined the side member 4. At the other end of the reach 2 there is another bracket member 31, the brackets 29 and 31 being upstanding and at their ends receive corresponding ends of brace rods 32, which latter both extend to a collar 33 at the upper end of the angle extension or spindle 13, being connected to the collar through the intermediary of ears 34, and these brace rods, together with the brackets 29 and 31, serve to support the upper end of the spindle 13, the lower end of this spindle being supported by the block 9 and parts carrying it.

Applied to the spindle 13 is an elongated sleeve 35 formed at the ends with respective heads 36 and 37. The upper end of the sleeve abuts against a washer 38, which in turn abuts against a collar 39, and the latter engages the collar 33, and as the spindle 13 does not rotate, the collars 33 and 39 may be made fast to this spindle in any appropriate manner, or the collar 33 alone may be made fast to the spindle. The lower end of the sleeve 35 rests upon a set collar 40, and in spaced relation to this set collar is another set collar 41, between which there is lodged a collar 42, which in turn may be made fast to the spindle, and this collar 42 is formed on one end of a rod 43, the latter being for a purpose which will presently appear.

Fast to the sleeve 35 adjacent the collar 36 is a circular series of radial arms 44, preferably each a metal plate of appropriate length, width and thickness, set on edge and forming a spider dished with relation to the collar, the outer ends of the arms 44 being in a plane spaced some little distance from the head 36 of the sleeve 35 in the direction of the axis of the spindle 13. At the outer ends the arms 44 are extended in width, as indicated at 45, to constitute the division members of boxes or receptacles to which reference will hereinafter be made. Each arm 44 near its outer or free end has attached thereto a brace rod 46 carried to the head 37 and connected to the latter, so that the spider is of truss formation of requisite strength, and yet without undue weight. The arms 44 carry at their outer ends a rim 47 which may be in the form of a continuous circular band constituting the outer sides of the boxes or recpetacles before referred to. Extending between the arms 44 and in spaced relation to the rim 47 toward the spindle 13 are plates 48 constituting the inner members of the boxes or receptacles referred to, and these inner members or sides 48 are straightened and together define a polygonal figure, although this particular arrangement is not mandatory. The spider, therefore, comprises radial arms 44, an outer circular member 47, and the inner members 48 in spaced relation to the outer member, and all these parts may be made of metal plate of appropriate gage. Mounted on the outer or rim member 47 and the plates 48 by means of pivots 49 are bottom members or plates 50 for said boxes or receptacles, and these bottom members may be simple flat plates of appropriate size, while the pivots 49 are intermediate of the length of these plates, so that the plates may be tipped on their pivots in a manner to cause one end of the plate to drop away from the confines of the box and the other end to move into the box, this position being well shown in Fig. 9. The spider, therefore, is provided with continuous peripheral series of boxes or receptacles made up of the rim 47 as an outer member, a plate 48 as an inner member, and two adjacent arms 44 as the side members, each arm 44 at its expanded end 45 constituting the side member of two adjacent boxes or receptacles.

Each plate 48 is formed, or has attached thereto intermediately two spaced lugs 51 of inclined or taper form having their adjacent edges abrupt, but in spaced relation. Each bottom member 50 adjacent its pivot or trunnion 49 on the side toward the plate 48 carries a finger 52 of sufficient length to enter between the lugs 51 and extend above the plate 48 where the finger is brought to a pointed end, as indicated at 53. When the finger 52 is lodged between the lugs 51, it holds the plate 50 in the closed position, but this finger is sufficiently elastic to bend toward the rim 47 under a suitable force to be thereby carried out of engagement with the lugs 51, and then the bottom 50 may be swung on its trunnions 49 to a tilted position, indicated in dotted lines in Fig. 7. This is brought about by means of a roller 54 near one end of an arm 55, said arm having an extended portion 56 beyond the roller 54. This arm is carried by the collar 38 on the spindle 13, and is of a length and so situated as to override the upper edges of the plates 48 without interference from the brace rods 46. Connected to the arm 55 near its supported end is a rod 57 carried by a hand lever 58 provided with a pawl and ratchet controlling mechanism 59 of common form, and this latter is fast to the extended upper end 60 of a post 61ᵃ made fast to the member 5 of the main frame 1 about intermediate of the length of said member 5. The extended end 60 is approximately horizontal when the machine is in operation, and provides a convenient support for a seat 61 for an operator, so that the hand lever 58 may be manipulated at will without the necessity of the operator leaving the seat 61.

The roller 54 is so situated as to be in the path of the free ends of the spring fingers 52 in such manner that when engaging these spring fingers, the latter are bent toward the rim 47 until free from the lugs 51, when the free end of the latch finger 52 being operated is engaged by the extended end 56 of the arm 55 and the bottom plate 50 of the receptacle under consideration is rocked on its trunnions 49 until ultimately the end 53 of the latch 52 underrides the extension 56 and escapes therefrom, but this does not occur until the bottom member 5 has first been rocked to a sufficient extent to cause the gravitation of the contents of the receptacle from such inclined bottom member.

As will hereinafter appear, the circular series of receptacles and the spiders supporting them are caused to rotate as the machine progresses along the ground, and ultimately the tilted bottom 50 under consideration reaches a curved strip 62 on the end of the arm 43 remote from the eye 42, this arm 43 being of sufficient length for the purpose, and being located in underriding relation to the elevated side of the tipped spider. Beyond the curved member 62 the arm carries a roller 63 on one end of a pivoted bracket 64, so that the open bottom member 50 is first engaged by the curved strip 62 which tends to move it toward the closed position and is ultimately engaged by the roller 63 with sufficient force to cause the spring fingers 52 to yield to the beveled lug 51 in its path and ultimately snap in the space between such lug and the adjacent lug 51, thereby again locking the bottom member 50 in the closed position. The bracket 64 is pivoted to the arm or rod 43, so as to be in trailing relation to an oncoming bottom member 50 and the curved strip 62 is carried to both sides of the rod or arm 43. This provides for the reversal of the machine and the proper closing of the bottom members 50 irrespective of the direction of rotation of the spider carrying them.

The arm 55 may be swung through a considerable arc by the hand lever 58, so that the bottom members 50 may be unlatched at different positions and the dumping of material may occur at different points in the rotation of the spider, the range usually employed approaching ninety degrees. For the reversal of the machine the arm 55 is readily disconnected from the rod 57 and may be swung to the other side of a center line perpendicular to the line of travel to be again connected to the lever 58 by the rod 57, whereby the opposite rotation of the spider due to the travel of the machine in the other direction from that first considered will cause the proper dumping of the buckets in any desired relation to the rotative movement of the series of buckets.

The position of the spindle 13 as to its angular relation to the vertical is such that the lower portion of the spider is brought into engagement with the ground, and this causes the rotative movement of the spider and of the series of buckets or receptacles carried thereby by the progressive movement of the machine over the ground, and in order that the frictional engagement may be ample for the purpose irrespective of the character or condition of the ground over which the machine is traveling, the collar 39 has fast thereto a bar 65 extending beyond the post or standard 61 and there provided with a manipulating handle 66. The post 61 has one edge formed with a series of teeth 67 and the bar 65 has a tooth 68 formed thereon, whereby the bar may be engaged in any one of the teeth 67 to thereby tilt the spindle 13 on the pivot support 10 of the block 9 and by this means the frictional engagement of the circular series of buckets and the spider supported thereby may be made as great as the conditions necessitate.

The members 3 and 4 of the main frame have guides 69 attached thereto at appropriate points, and in these guides slide angle members 70, being adjusted in a substantially vertical direction by means of angle latch levers 71 pivoted to the angle members which at their upper ends are formed with rack segments 72 and have their angle ends connected by links 73 to the respective frame members 3 and 4. The lower ends of the angle members 70 carry a guide plate 74 closely adjacent to that portion of the spider which engages the ground and generally in concentric relation to such portion of the spider member, although the lower edge of this guide member where engaging the ground flares away from the spider member.

To the beam 5 of the main frame 1 about midway of its length there is made fast a yoke 75 and between the legs of this yoke there is pivoted a block 76 by means of a bolt 77, and this block has an angle extension 78 receiving a shank member 79 carrying a disk plow 80 held to the shank member and the latter to the angle extension 78 by a bolt 81. The disk plow is held in proper position by means of a link 82 connected at one end to the block 76, and at the other end to one of two eyes 83 on opposite sides of the yoke 75. This permits the plow 80 to be properly positioned for either direction of travel of the machine. The disk plow 80 is to be taken as simply typical of any suitable dirt engaging device, whether of disk plow type or some other plow type, or simply as a scraper, the function of the device being to direct dirt toward and into the receptacle carried by the spider, while the plate 74 is in the nature of a share which assists the plow in directing the dirt to the receptacles and prevents any loose dirt from escaping between the plow and the receptacles.

Adjacent the guides 69 and between the same and the reach 2, the members 3 and 4 carry respective brackets 84 made fast thereto in line one with the other in the direction of travel and about in line with the buckets where engaging the ground. Fast to each bracket 84 is a connecting member 85 made fast to the bracket 84 by bolts 86 or otherwise, and the ends of these connecting members 85 remote from the respective brackets 84 are each formed with an eye 87 for the reception of a pole 88 to which may be attached draft devices 89 of any suitable type. The pole is designed to lie against the corresponding end of the connecting member 85 after being passed through the eye 87 and secured thereto by a bolt 90, so that the pole may be readily detached from one connecting member 85 and attached to the other as desired. The connecting member 85 is provided with spaced ears 91 forming bearings for a rock shaft 92 extending to one side of the connecting member and there bent into an angle portion 93 terminating in a spindle extension 94 carrying a supporting wheel 95. The shaft 93 has fast thereto a hand lever 96 and the connecting member 85 has fast thereto a rack segment 97 whereby the shaft 92 may be rocked in its bearings and locked in different positions of adjustment. Both members 85 are provided with adjustable wheels 95 and these wheels together with the adjustable wheel or roller 22 support the entire machine. The adjustability of these wheels with relation to the main frame permit the proper positioning of the entire machine with reference to the ground.

It is sometimes desirable to raise or lower the circular rotatable series of buckets to a greater extent than provided for by the adjustment of the wheel or roller 22, and this may be accomplished by shifting the collars on the spindle 13 to the proper extent, the said spindle being made long enough for the purpose.

By removing one of the bolts 86, the draft devices will swing on the other bolt and the machine may be turned with the same facility as a wagon.

To more certainly insure the rotation of the series of buckets, the rim 47 may have suitable means thereon where touching the ground to cause it to engage the ground after the manner of a traction wheel, which latter is commonly provided with lugs or spurs for the purpose.

What is claimed is:—

1. In an excavating machine, an inclined rotatable series of dirt receiving buckets or receptacles with one edge in position to engage the ground, a plow in operative relation to the series of buckets where engaging the ground, and a deflector plate or share between the plow and that portion of the series of buckets engaging the ground.

2. In an excavating machine, an inclined rotatable series of dirt receiving buckets or receptacles, with one edge in position to engage the ground, a plow mechanism in operative relation to the series of buckets where engaging the ground, and a deflector plate or share between the plow and that portion of the series of buckets engaging the ground, said deflector plate being curved in opposite directions from a central point to be active in opposite directions of travel of the machine.

3. In an excavating machine, an inclined rotatable series of dirt receiving buckets or receptacles with one edge in position to engage the ground, a plow mechanism in operative relation to the series of buckets where engaging the ground, and a deflector plate or share between the plow and that portion of the series of buckets engaging the ground, said deflector plate having adjustable supports whereby the plate may be adjusted in directions toward and from the ground.

4. In an excavating machine, a suitable frame, adjustable wheel supports therefor whereby the distance of the frame from the ground may be varied, an inclined rotatable circular series of buckets or receptacles for dirt having one edge in engaging relation to the ground, and means for varying the inclination of the axis of rotation of the circular series of buckets.

5. In an excavating machine, a suitable frame, supporting wheels therefor having adjustable connections with the frame for varying the distance of the latter from the ground, an inclined circular rotatable series of buckets or receptacles at one point adapted to engage the ground, a plow mechanism carried by the frame, means for adjusting the inclination of the circular series of buckets, and a deflector plate or share carried by the frame and adjustable thereon toward and from the ground.

6. In an excavating machine, a suitable frame provided at opposite points with brackets and coupling members fast thereto, said coupling members having means for the attachment thereto of draft appliances, and supporting wheels, one carried by each coupling member and provided with means for the adjustment of the wheel to determine the distance of the frame from the ground.

7. In an excavating machine, a suitable frame, oppositely disposed brackets connected to the frame, coupling members one fast to each bracket and provided with means for the attachment thereto of draft appliances, a rock shaft journaled on the coupling member and provided with an angle extension, a wheel mounted on said angle extension, a hand lever connected to the rock shaft, and a rack segment connected to the coupling member whereby the rock shaft may be adjusted to determine the relation of the wheel to the frame for regulating the elevation of the frame with reference to the ground.

8. In an excavating machine, a suitable frame, oppositely disposed brackets connected to the frame, coupling members one fast to each bracket and provided with means for the attachment thereto of draft appliances, a rock shaft journaled on the coupling member and provided with an angle extension, a wheel mounted on said angle extension, a hand lever connected to the rock shaft, and a rack segment connected to the coupling member whereby the rock shaft may be adjusted to determine the relation of the wheel to the frame for regulating the elevation of the frame with reference to the ground, said frame also carrying a third supporting wheel intermediate of the first named wheels and to one side of the line of draft, said third supporting wheel having means for adjusting its relation to the frame to determine the height of the portion of the frame supported thereby with relation to the ground.

9. In an excavating machine, a suitable frame, oppositely disposed brackets connected to the frame, coupling members one fast to each bracket and provided with means for the attachment thereto of draft appliances, a rock shaft journaled on the coupling member and provided with an angle extension, a wheel mounted on said angle extension, a hand lever connected to the rock shaft, and a rack segment connected to the coupling member whereby the rock shaft may be adjusted to determine the relation of the wheel to the frame for regulating the elevation of the frame with reference to the ground, said frame also carrying a third supporting wheel intermediate of the first named wheels and to one side of the line of draft, said third supporting wheel having means for adjusting its relation to the frame to determine the height of the portion of the frame supported thereby with relation to the ground, said third supporting wheel having its mounting pivoted to the frame for causing the wheel to assume trailing relation to the line of draft in accordance with the direction of movement of the machine as a whole.

10. In an excavating machine, a suitable frame, an inclined rotatable series of material receiving buckets mounted on the frame, a supporting wheel adjacent the axis of rotation of the buckets, and means for adjusting the relation of the wheel to the frame to determine the height of the latter with reference to the ground.

11. In an excavating machine, a suitable frame, an inclined rotatable series of material receiving buckets mounted on the frame, a supporting wheel adjacent the axis of rotation of the buckets, and means for adjusting the relation of the wheel to the frame to determine the height of the latter with reference to the ground, said adjusting means comprising a worm gear having an operating shaft extending beyond one edge of the rotatable series of buckets and there accessible for manipulation, said worm gear having a threaded shaft, a threaded bracket carried by said shaft, and a caster bearing for the supporting wheel carried by said bracket.

12. In an excavating machine, a rotatable member having a circular peripheral series of buckets or receptacles, an inclined spindle supporting the rotatable member at an inclination, said spindle having an angle continuation directed toward the ground, a caster wheel having a journal bearing mounted on the angle continuation of the spindle for movement thereabout and therealong, and gearing connections for causing the elevation and lowering of the caster support for the wheel along the angle extension of the spindle.

13. In an excavating machine, a rotatable member having a circular peripheral series of buckets or receptacles, an inclined spindle supporting the rotatable member at an inclination, said spindle having an angle continuation directed toward the ground, a caster wheel having a journal member mounted on the angle continuation of the spindle for movement thereabout and therealong, and gearing connections for causing the elevation and lowering of the caster support for the wheel along the angle extension of the spindle, said gearing connections comprising a third shaft engaging the caster connections, and worm gearing controlling said shaft and having a manipulating portion extending beyond the margin of the rotatable member and there accessible for manipulation.

14. In an excavating machine, a rotatable circular series of buckets or receptacles, a supporting spider therefor having a central sleeve, an inclined spindle for the sleeve and having an angle extension, a rockable bearing for the spindle, a caster wheel mounted on the angle extension of the spindle and slidable therealong, an adjusting mechanism for the caster bearing for moving it along the angle extension of the spindle and holding it in adjusted positions, and means for rocking the spindle on its bearing to different positions of adjustment.

15. In an excavating machine, a rotatable circular series of buckets or receptacles, means for causing the opening of the receptacles for dumping purposes, means for causing the subsequent closing of the receptacles, and means for adjusting the time of action of the opening mechanism with relation to the point of filling the buckets.

16. In an excavating machine, an inclined rotatable series of material conveying buckets or receptacles each provided with a tiltable bottom member, and a latch member fast thereto, and means for causing the unlatching of the bottom member comprising an arm having a roller thereon for engagement with the latch member to move the latter to the unlatched position, said arm having an extension in the path of the latch mechanism when in the unlatched position for causing the tilting of the bottom member.

17. In an excavating machine, a circular rotatable series of buckets or receptacles each provided with a bottom member intermediately pivoted and having an elastic latch arm projecting therefrom, each bucket or receptacle also being provided with holding means for the latch member, and means for unlatching and tilting the bottom member comprising an arm with a roller adjacent to and spaced from the end of the arm, said roller being in the path of the latch member to bend the same out of engagement with the holding means and the projecting end of the arm subsequently engaging the latch member to tilt the bottom of the bucket.

18. In an excavating machine, a circular rotatable series of buckets or receptacles each provided with an intermediately pivoted bottom member having an elastic latch member projecting therefrom, each bucket being also provided with locking lugs for the latch member, a relatively fixed arm in the path of the latch members and having a roller thereon spaced from the end of the arm to first engage the latch member and bend it to the unlatched position with the projecting end of the arm engaging the latch member to tilt the bottom of the receptacle, and adjusting means for the arm for varying the point of engagement of the arm with the latch members.

19. In an excavating machine, a rotatable series of buckets or receptacles each provided with a dumping bottom, latch means for holding the bottom in the closed position, closing means for the bottom of the buckets, and means movable to either side of the closing means for causing the opening of the bottoms of the buckets to dumping position prior to reaching the closing mechanism irrespective of the direction of travel of the machine.

20. In an excavating machine, a circular rotatable series of buckets or receptacles each provided with an intermediately pivoted tiltable bottom member, and means for causing the closing of the bottom member after having been moved to the open position, comprising an arm carrying a curved strip and a trailing roller in position to cause the strip to first engage the bottom member to move the same into engagement with the roller for the latter to complete the closing movement.

21. In an excavating machine, a circular rotatable series of material receiving buckets, each bucket having a dumping bottom provided with a latch mechanism for holding it in the closed position, an actuating mechanism for the latch for unlatching the bottom of the bucket and moving it to the open position, said operating mechanism being movable to either side of a central point, and a closing means on the bottoms of the buckets acting subsequently to the opening means and adjustable to cause the closing of the bucket bottoms in any desired time relation to the opening thereof.

22. In an excavating machine, a rotatable circular series of buckets comprising a central sleeve, radial members in dished relation to the central sleeve and each terminating in an axially widened portion, a marginal strip connecting the ends of the radial members and forming the outer sides of the buckets, intermediate strips at the inner edges of the widened portions of the radial members and constituting the inner sides of the buckets, and tiltable bottom members for the buckets located between the radial members.

23. In an excavating machine, a rotatable circular series of buckets comprising a central sleeve, radial members in dished relation to the central sleeve and each terminating in an axially widened portion, a marginal strip connecting the ends of the radial members and forming the outer sides of the buckets, intermediate strips at the inner edges of the widened portions of the radial members and constituting the inner sides of the buckets, and tiltable bottom members for the buckets located between the radial members, said radial members being supported near the bucket ends by braces extending to the end of the sleeve remote from that carrying the radial members.

24. In an excavating machine, a rotatable circular series of buckets comprising a central sleeve, radial members in dished relation to the central sleeve and each terminating in an axially widened portion, a marginal strip connecting the ends of the radial members and forming the outer sides of the buckets, intermediate strips at the inner edges of the widened portions of the radial members and constituting the inner sides of the buckets, and tiltable bottom members for the buckets located between the radial members, said bottom members being each provided with intermediate pivot supports and with latch members movable with the bottom members, and the inner walls of the receptacles being provided with engaging means for the latch members.

In testimony, that I claim the foregoing as my own, I have hereto affixed my signature in the presence of two witnesses.

GEORGE WASHINGTON JORY.

Witnesses:
    W. O. Wood,
    H. M. Strawn.

---

Copies of this patent may be obtained for five cents each, by addressing the "Commissioner of Patents, Washington, D. C."